(12) United States Patent
Oscarsson et al.

(10) Patent No.: US 10,393,897 B2
(45) Date of Patent: *Aug. 27, 2019

(54) LOW-FREQUENCY LORENTZ MARINE SEISMIC SOURCE

(71) Applicant: PGS Geophysical AS, Oslo (NO)

(72) Inventors: Mattias Oscarsson, Oslo (NO); Oeystein Traetten, Oslo (NO); Rune Voldsbekk, Oslo (NO); Rune Toennessen, Oslo (NO)

(73) Assignee: PGS Geophysical AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 15/955,075

(22) Filed: Apr. 17, 2018

(65) Prior Publication Data

US 2018/0231674 A1 Aug. 16, 2018

Related U.S. Application Data

(62) Division of application No. 14/523,111, filed on Oct. 24, 2014, now Pat. No. 9,971,049.

(Continued)

(51) Int. Cl.
| | |
|---|---|
| *G01V 1/04* | (2006.01) |
| *G01V 1/38* | (2006.01) |
| *B06B 1/04* | (2006.01) |
| *G01V 1/135* | (2006.01) |
| *G10K 11/20* | (2006.01) |

(52) U.S. Cl.
CPC ............... *G01V 1/04* (2013.01); *B06B 1/045* (2013.01); *G01V 1/135* (2013.01); *G01V 1/38* (2013.01); *G10K 11/205* (2013.01); *B06B 2201/53* (2013.01); *G01V 2210/1214* (2013.01)

(58) Field of Classification Search
CPC . G01V 1/04; G01V 1/135; G01V 1/38; G01V 2210/1214; G10K 11/205; B06B 1/045; B06B 2201/53
See application file for complete search history.

(56) References Cited

U.S. PATENT DOCUMENTS

| 2,014,412 A | 9/1935 | Pierce |
| 2,116,522 A | 5/1938 | Kunze |

(Continued)

FOREIGN PATENT DOCUMENTS

JP  6003458  1/1994

OTHER PUBLICATIONS

European partial search Report dated Jun. 8, 2015, in the prosecution of patent application No. 14198114.2, 7 pages.

(Continued)

*Primary Examiner* — Hovhannes Baghdasaryan

(57) ABSTRACT

This disclosure is related to marine seismic sources, for example marine seismic sources known in the art as benders. Some embodiments of this disclosure use Lorentz forces to produce seismic energy. For example, magnets and wire coils may be attached to one or more plates of a marine seismic source, and the Lorentz interaction between them may cause deformation of the plates to produce seismic energy. Such marine seismic sources may be components of a marine seismic survey system, and may be used in a method of marine seismic surveying. Methods of making marine seismic sources are also disclosed.

20 Claims, 6 Drawing Sheets

Related U.S. Application Data

(60) Provisional application No. 61/920,118, filed on Dec. 23, 2013.

(56) References Cited

U.S. PATENT DOCUMENTS

| | | | |
|---|---|---|---|
| 2,401,943 A * | 6/1946 | Leigh | B06B 1/085 |
| | | | 318/118 |
| 2,419,196 A | 4/1947 | Benioff | |
| 2,421,263 A * | 5/1947 | Herbst | H04R 15/00 |
| | | | 367/156 |
| 2,515,154 A | 7/1950 | Lanphier | |
| 2,517,565 A | 8/1950 | Hayes | |
| 2,963,681 A | 12/1960 | Morgan | |
| 3,193,460 A | 7/1965 | Krabbe et al. | |
| 3,308,423 A | 3/1967 | Massa | |
| 4,866,682 A | 9/1989 | Uchihashi et al. | |
| 5,126,979 A | 6/1992 | Rowe, Jr. et al. | |
| 5,268,879 A | 12/1993 | Flanagan | |
| 5,646,380 A | 7/1997 | Vaage | |
| 8,335,126 B2 | 12/2012 | Sudow et al. | |
| 9,158,019 B2 | 10/2015 | Bagaini | |
| 9,606,252 B2 | 3/2017 | Oscarsson et al. | |
| 2008/0123471 A1 | 5/2008 | Rode et al. | |
| 2008/0228403 A1 | 9/2008 | Robertson | |
| 2009/0086574 A1 | 4/2009 | Scott et al. | |
| 2009/0236937 A1 | 9/2009 | Shiba | |
| 2009/0268554 A1 | 10/2009 | Armstrong | |
| 2011/0317515 A1 | 12/2011 | Tenghamn | |
| 2012/0051188 A1 | 3/2012 | Graber | |
| 2012/0280516 A1 | 11/2012 | Vloss | |
| 2013/0037342 A1 | 2/2013 | Engdahl | |
| 2013/0044565 A1 | 2/2013 | Barr et al. | |
| 2014/0241117 A1 | 8/2014 | Dellinger et al. | |

OTHER PUBLICATIONS

European Search Report, Applicaiton No. 14198114.2, dated Oct. 14, 2015.

* cited by examiner

LOW-FREQUENCY LORENTZ MARINE SEISMIC SOURCE

CROSS-REFERENCE TO RELATED APPLICATIONS

This application is a divisional application of U.S. application Ser. No. 14/523,111 filed Oct. 24, 2014 titled "Low-Frequency Lorentz Marine Seismic Source" (now U.S. Pat. No. 9,971,049). The Ser. No. 14/523,111 application claims the benefit of U.S. Provisional Application No. 61/920,118 filed Dec. 23, 2013 and titled "Low Frequency Sound Bender Actuation Based on Lorentz Forces." Both applications are incorporated by reference herein as if reproduced in full below.

BACKGROUND

In the oil and gas exploration industry, marine geophysical prospecting is commonly used in the search for hydrocarbon-bearing subterranean formations. Marine geophysical prospecting techniques may yield knowledge of the subsurface structure of the Earth, which is useful for finding and extracting hydrocarbon deposits such as oil and natural gas. Seismic surveying is one of the well-known techniques of marine geophysical prospecting.

In some instances of seismic surveying conducted in a marine environment (which may include saltwater, freshwater, and/or brackish water environments), one or more marine seismic sources are typically configured to be submerged and towed by a vessel. The vessel is typically also configured to tow one or more laterally spaced streamers through the water. At selected times, control equipment may cause the one or more marine seismic sources to actuate. Seismic signals may then be received by sensors disposed along the streamers. Data collected during such a seismic survey may be analyzed to assist identification of hydrocarbon-bearing geological structures, and thus determine where deposits of oil and natural gas may be located.

DETAILED DESCRIPTION

Figure 1:
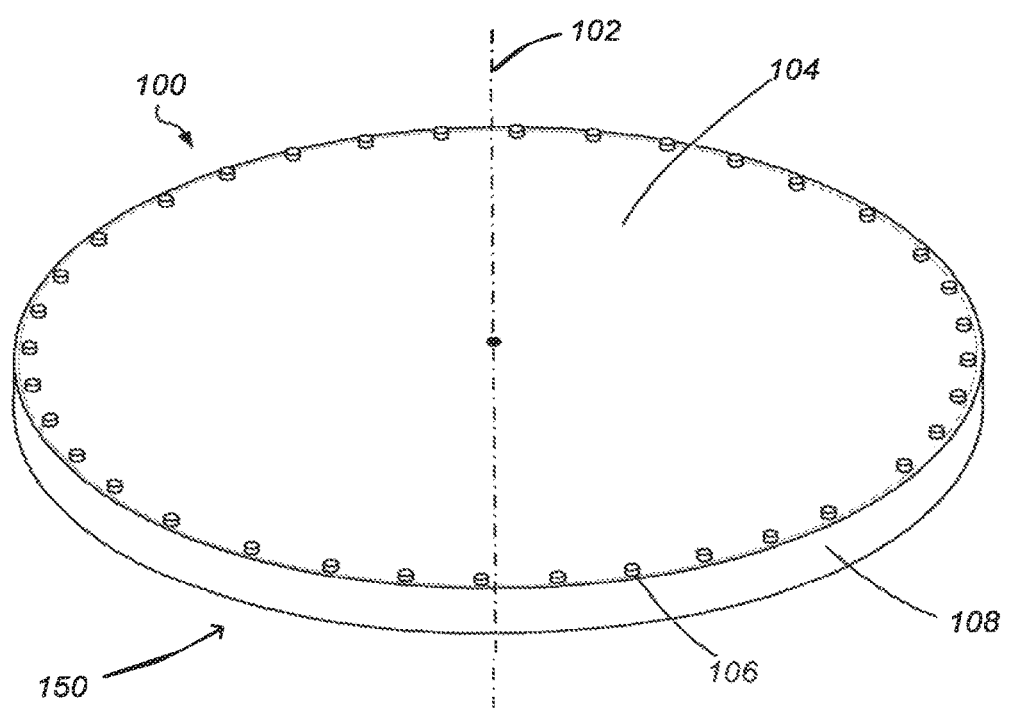
FIG. 1 illustrates an embodiment of a marine seismic source according to this disclosure.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various devices, units, circuits, or other components may be described or claimed as "configured to," "usable to," or "operable to" perform a task or tasks. In such contexts, "configured to," "usable to," and "operable to" are each used to connote structure by indicating that the devices/units/circuits/components include structure that performs the task or tasks during operation. As such, the device/unit/circuit/component can be said to be configured to, usable to, or usable to perform the task even when the specified device/unit/circuit/component is not currently operational (e.g., is not on or in operation). The devices/units/circuits/components used with the "configured to," "usable to," or "operable to" language may include electronic hardware—for example, circuits, memory storing program instructions executable to implement the operation, etc.—mechanical devices, or other types of structure. Reciting that a device/unit/circuit/component is "configured to," "usable to," or "operable to" perform one or more tasks is expressly intended not to invoke 35 U.S.C. § 112(f), for that device/unit/circuit/component.

In some embodiments, various items of information relating to seismic surveying may be embodied in a geophysical data product. A "geophysical data product" may be stored on a computer-readable, non-transitory medium and may embody geophysical data (such as raw streamer data, processed streamer data, two- or three-dimensional maps based on streamer data, etc.). Some non-limiting examples of computer-readable media may include hard drives, CDs, DVDs, print-outs, etc. In some embodiments, raw analog data from streamers may be stored as a geophysical data product. In other instances, the data may first be digitized and/or conditioned prior to being stored as the geophysical data product. In yet other instances, the data may be fully processed into a two- or three-dimensional map of the various geophysical structures before being stored in the geophysical data product. The geophysical data product may be produced offshore (e.g., by equipment on a vessel) or onshore (e.g., at a facility on land) either within the United States or in another country. If the geophysical data product is produced offshore or in another country, it may be imported onshore to a facility in the United States. Once onshore in the United States, geophysical analysis may be performed on the geophysical data product.

In some instances of a typical marine seismic survey, one or more marine seismic sources may be used to generate seismic energy. The seismic energy may travel downward through the water and through the formations underlying the water bottom. Impedance boundaries within the subsea formations may reflect (at least in part) the seismic energy that travels through such formations. The reflected seismic energy may then travel upwards. Geophysical sensors (e.g., hydrophones, geophones, accelerometers, etc.) may capture such reflected seismic energy. These geophysical sensors may convert the captured seismic energy into signals, such as optical or electrical signals. The electrical or optical signals may then be interpreted to provide information as to the composition and/or structure of the various subsurface formations under the water bottom. Such information may be used, for example, to determine the possibility that such formations may contain mineral deposits including hydrocarbons.

One type of marine seismic source that may be used in seismic surveying operations is a flexural disc projector, commonly known as a "bender." A typical bender may employ one or more piezoelectric elements, such that the mechanical vibration of the bender is driven by piezoelectric distortion based on electrical energy applied to the piezoelectric element. For example, when electrical energy (e.g., a voltage) is applied to a piezoelectric material, a volume or length of the piezoelectric element may increase or decrease in response. This phenomenon is generally termed the "inverse piezoelectric effect," and it may be exploited in order to produce seismic energy. For example, a piezoelectric element may be attached (e.g., glued) to a portion of a marine seismic source, such that the contractions and/or expansions of the piezoelectric element may cause deformations in the portion, and the deformations may cause seismic energy to be transmitted through the water.

However, although common, typical piezoelectric benders may be subject to various disadvantages in some cases. For example, they are often labor-intensive and expensive to produce. Further, large piezoelectrics may be especially difficult to produce, which can effectively limit the size of piezoelectric benders. Piezoelectric elements may also be prone to cracking, as well as being sensitive to pressure variations. Accordingly, as described more fully below, some embodiments of this disclosure include marine seismic sources that use the Lorentz force (e.g., the force between a magnet and a current loop) to produce seismic energy. This new technique may ameliorate some of the difficulties that have arisen with piezoelectric marine seismic sources.

When seismic energy travels through water and subsea formations, higher frequency seismic energy may typically be attenuated more rapidly than lower frequency waves. Accordingly, seismic energy at lower frequencies (for example, infrasound) may typically be transmitted over longer distances through water and subsea formations than higher frequency seismic energy. A marine seismic source that produces seismic energy at lower frequencies may thus have utility in marine seismic surveys, particularly those conducted in increased water depths.

The design parameters for a marine seismic source may include, among others, seismic energy output within a low frequency range (e.g., between 2 Hz and 20 Hz, or between 2 Hz and 10 Hz), water depth, weight, size and cost. For example, it may be advantageous for a marine seismic source to be capable of supplying broadband low-frequency energy, e.g., such that the frequency spectrum may be changed as desired according to the geophysical properties in a survey. As modern marine seismic surveys continue to explore waters at increased depths, there is a continuing need for a low cost (for example, both in terms of manufacturing cost and operating cost) marine seismic source that produces high seismic energy at lower frequencies, particularly at frequencies in the range of approximately 2 Hz to 10 Hz. Some embodiments of this disclosure are particularly applicable in this frequency range, although other embodiments are operable in larger ranges, such as 2 Hz to 20 kHz.

In the context of a low-frequency source (which generally refers to a source outputting a frequency in the range of 2-10 Hz), it may be advantageous to tow the source at a depth of approximately $\lambda/4$, where $\lambda$ is the wavelength of the seismic energy being output by the low-frequency source. For example, since seawater has a sound velocity of approximately 1,500 meters/second, $\lambda/4$ for a 5 Hz source would be approximately 75 meters. For a frequency in the range of 2-10 Hz, $\lambda/4$ would be between approximately 35 and 190 meters.

Turning now to FIG. 1, an exemplary illustration of marine seismic source 100 is shown. As shown, marine seismic source 100 may be in the form of an electromechanical device such as a bender. It should be noted that FIG. 1 may not necessarily be drawn to scale: in some embodiments, marine seismic source may have a larger or a smaller height relative to its radius.

Marine seismic source 100 in this embodiment is generally cylindrical, and it is arranged about axis 102. Marine seismic source 100 includes top plate 104, as well as a corresponding bottom plate 150 (not shown due to the perspective of FIG. 1). These plates are held in place via fasteners 106 (such as bolts), which connect them to hoop 108. Hoop 108 extends around the circumference of marine seismic source 100 and provides a desired separation between top plate 104 and bottom plate 150. Hoop 108 may also provide a fixed contact against which top plate 104 and bottom plate 150 can flex inwardly and outwardly.

One of ordinary skill in the art with the benefit of this disclosure will understand that the references to "top" and "bottom" plate are not intended to indicate that the top plate must necessarily be above the bottom plate. These designations are instead intended only to simplify the descriptions of the drawings in this disclosure. In embodiments of marine seismic sources according to this disclosure, the "top" and "bottom" plates may be in any desired physical orientation relative to one another.

An interior cavity may be formed between top plate 104 and bottom plate 150, and this interior cavity may be configured to contain a volume of gas (such as air, nitrogen, or any other suitable substance). In some embodiments, the volume of gas within the interior cavity may be pressurized. In marine applications, pressurizing and maintaining the volume of gas within the interior cavity at an ambient hydrostatic pressure at a selected operating water depth may protect marine seismic source 100 from collapsing from the ambient hydrostatic pressure.

Plates 104 and 150 may each be of a circular shape, an elliptical shape, or some other shape. Plates 104 and 150 may be made from a material such as metal (e.g., aluminum, steel, etc.). Plates 104 and 150 may be made from the same material in one embodiment. Yet in another embodiment, they may be made from different materials.

Not shown in FIG. 1, various types of circuitry and components may be used to produce seismic energy by causing top plate 104 and/or bottom plate 150 to move. As noted above, one possibility is the use of one or more piezoelectric elements (e.g., piezoelectric ceramics glued to the interior or exterior surfaces of the plates). In accordance with this disclosure, however, magnetic elements and wire coils may in some embodiments also be used to cause marine seismic source 100 to produce seismic energy.

Figure 2A:
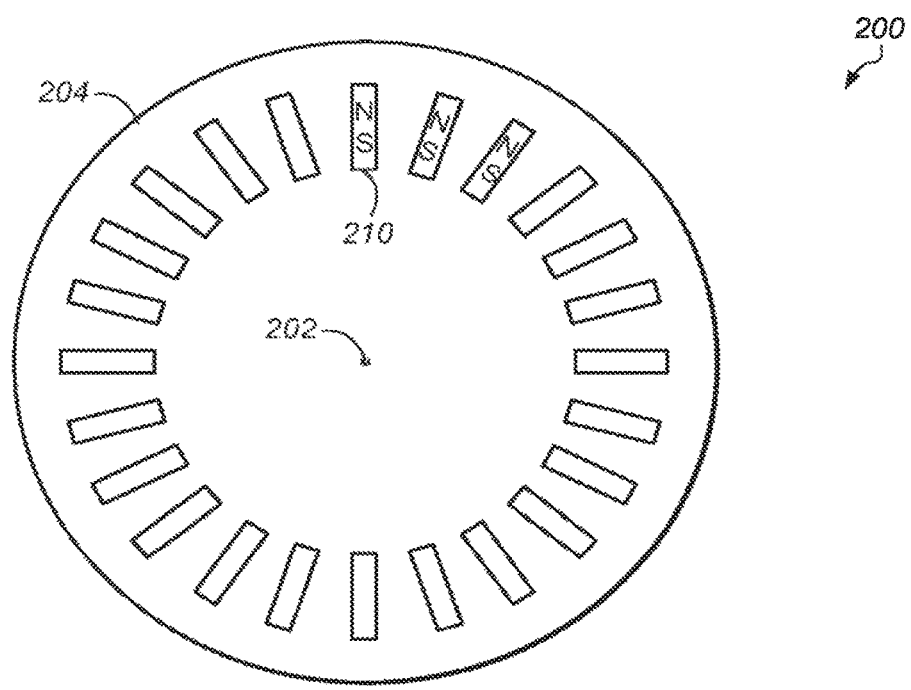
FIGS. 2A-2B illustrate a disassembled view of an embodiment of a marine seismic source according to this disclosure.
Figure 2B:
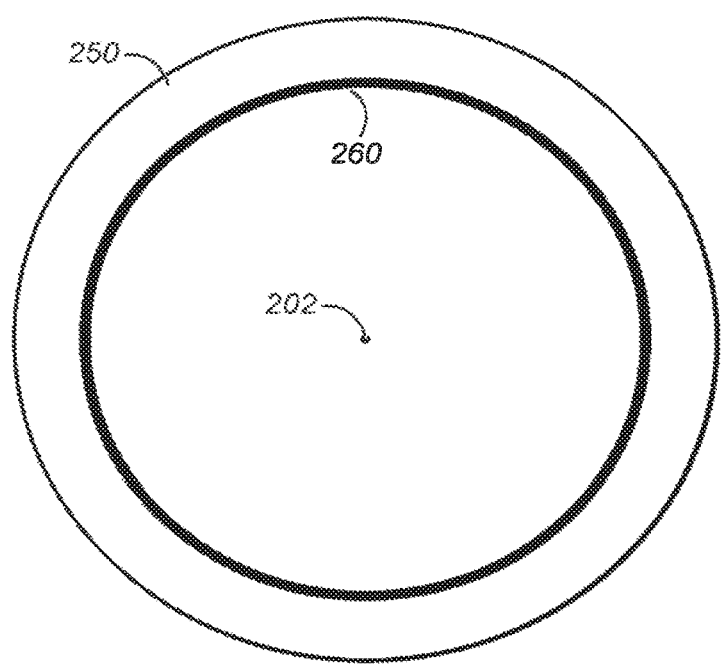

Turning now to FIGS. 2A and 2B, views are shown respectively of top plate 204 and bottom plate 250 of marine seismic source 200. A hoop operable to connect these two plates (e.g., corresponding to hoop 108 in FIG. 1) is not shown, and axis 202 is shown as passing through both top plate 204 and bottom plate 250. When assembled, top plate 204 and bottom plate 250 would be aligned along axis 202. Top plate 204 includes magnets 210 arranged in a circle. In some embodiments, magnets 210 may be attached to the bottom surface of top plate 204. In other embodiments, magnets 210 may extend through the interior of top plate 204, being magnetically accessible to the bottom surface of top plate 204. Magnets 210 may be any suitable type of magnet, such as permanent magnets (e.g., made from any of various suitable materials) and/or electromagnets.

Magnets 210 are shown as having their south poles pointed toward the center of top plate 204 and having their north poles pointed outward, but one of ordinary skill in the art with the benefit of this disclosure will understand that this could be reversed in some embodiments. It may, however, be advantageous for all of magnets 210 to be facing in the same direction (e.g., south poles all facing inward or all facing outward).

Further, magnets 210 need not necessarily be arranged in a circle. A circular arrangement may be advantageous, for example, in a marine seismic source having circular plates. However, any suitable arrangement of magnets 210 may be used.

Bottom plate 250 is shown with wire coil 260 positioned such that it would be adjacent to magnets 210 in the assembled device. In some embodiments, wire coil 260 may be attached to the top surface of bottom plate 250. In other embodiments, wire coil 260 may extend through the interior of bottom plate 250, being magnetically accessible to the top surface of bottom plate 250. It may be advantageous for magnets 210 and wire coil 260 to be placed such that, when electrical current is passed through wire coil 260 in the assembled device, an induced magnetic field around wire coil 260 may interact with the magnetic field of magnets 210 to cause the plates to move due to the Lorentz force. Wire coil 260 may consist of a single loop of wire or multiple loops of wire, as appropriate. Various electronic components, not shown in FIGS. 2A and 2B, may be used to supply electrical energy to wire coil 260.

In the embodiment illustrated by FIGS. 2A and 2B, when electrical energy (e.g., a sinusoidal voltage or current) is applied to wire coil 260, top plate 204 and/or bottom plate 250 may bend, flex, or otherwise be distorted (e.g., due to the Lorentz force arising from the interaction between the magnetic fields of magnets 210 and the induced magnetic field of wire coil 260), resulting in vibration and seismic energy output. In this embodiment, the plates may bend, flex, or otherwise be distorted axially along axis 202. In some embodiments, the distortions may be axially symmetric or symmetric with respect to axis 202. According to one embodiment, a typical driving current may be approximately 5 A/mm$^2$, and/or a typical driving voltage may be in the range of 0V-1 kV.

A maximum sound pressure level of a marine seismic source may typically occur at or near a mechanical resonance frequency of the marine seismic source. Broadly speaking, sound pressure level is a difference, in a given medium, between a pressure associated with the seismic energy and an average local pressure. The square of this difference may be averaged over time and/or space, and a square root of this average may provide a root-mean-square (RMS) pressure value or $P_{rms}$. Sound pressure level is a logarithmic measure indicating a ratio of a given $P_{rms}$ relative to a reference sound pressure or $P_{ref}$. Sound pressure level is typically measured in decibels (dB). In marine applications, a reference pressure $P_{ref}$ is usually 1 micropascal (1 μPa). In mathematical terms, sound pressure level may be calculated by the equation below:

$$\text{Sound Pressure Level (dB)} = 20 \log (P_{rms}/P_{ref})$$

One of ordinary skill in the art with the benefit of this disclosure will understand that the diameter, thickness, and material construction of top plate 204 and bottom plate 250 may advantageously be designed in order to achieve desirable operational characteristics (e.g., a resonance frequency in a selected range, such as 2-20 Hz). This may provide a sufficiently large sound pressure level in the frequency range of interest. According to one embodiment, top plate 204 and bottom plate 250 may be approximately 450-700 mm in diameter. According to one embodiment, top plate 204 and bottom plate 250 may be approximately 3-5 mm in thickness. Any suitable material may be used, such as aluminum, steel, other metals, alloys, composites, etc.

Magnets 210 and/or wire coil 260 may in some embodiments be attached by an adhesive, such as epoxy, or they may be bolted in place, or they may be attached via any other suitable means. However, there is no limitation as to how such components may be attached to plates 204 and 250. As used herein, the words "attach," or "attached" (and other derivations thereof) should be understood to mean a connection between components, whether direct or indirect.

As will be described in more detail below, in some embodiments, more than one wire coil 260 may be used; additionally, more than one set of magnets 210 may also be used. For example, a plurality of wire coils and a corresponding plurality of sets of magnets may in some embodiments be arranged in concentric circles on one or both of the plates.

Figure 3:
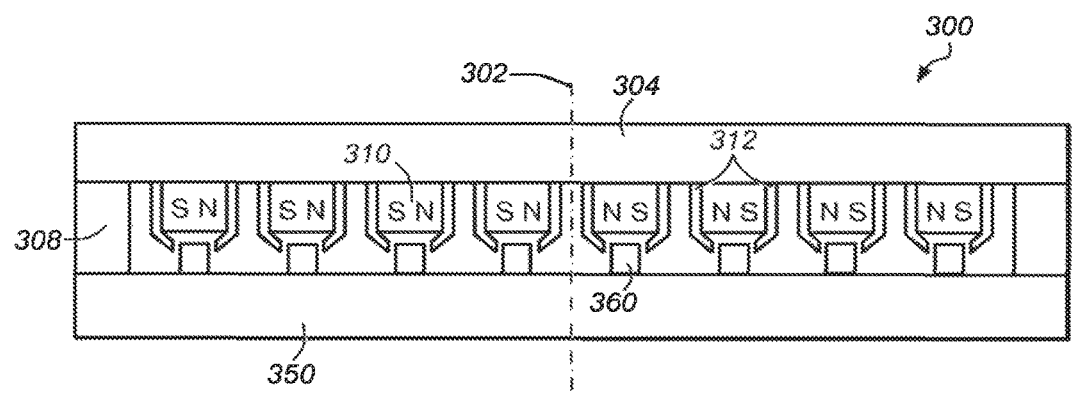
FIG. 3 illustrates a cross-sectional view of an embodiment of a marine seismic source according to this disclosure.

Turning now to FIG. 3, a cross-sectional view of an embodiment of marine seismic source 300 is shown. Marine seismic source 300 is arranged about axis 302, and it includes top plate 304 and bottom plate 350 separated by hoop 308. In this illustration, top plate 304 has attached thereto a plurality of sets of magnets 310. That is, this cross-sectional view depicts a situation in which four concentric circles of magnets 310 have been attached to top plate 304. Four corresponding wire coils 360 have been attached to bottom plate 350.

In some embodiments, such as the embodiment shown in FIG. 3, magnets 310 may have pole pieces 312 (e.g., made of iron or some other ferromagnetic material) attached thereto in order to concentrate their respective magnetic fields in a desired region. As shown, magnets 310 and pole pieces 312 are arranged such that their magnetic fields are concentrated in a region proximate to wire coils 360. FIG. 3 is not necessarily drawn to scale, and one of ordinary skill in the art with the benefit of this disclosure will recognize that the spacing between pole pieces 312 (and/or magnets 310) and wire coils 360 may advantageously be selected in order to produce the desired forces. Further, pole pieces 312 may in some embodiments advantageously be designed such that they do not come into physical contact with wire coils 360 during normal operation of marine seismic source 300. It may further be advantageous for magnets 310 not to come into contact with wire coils 360, and/or for pole pieces 312 not to come into contact with bottom plate 350.

Figure 4:
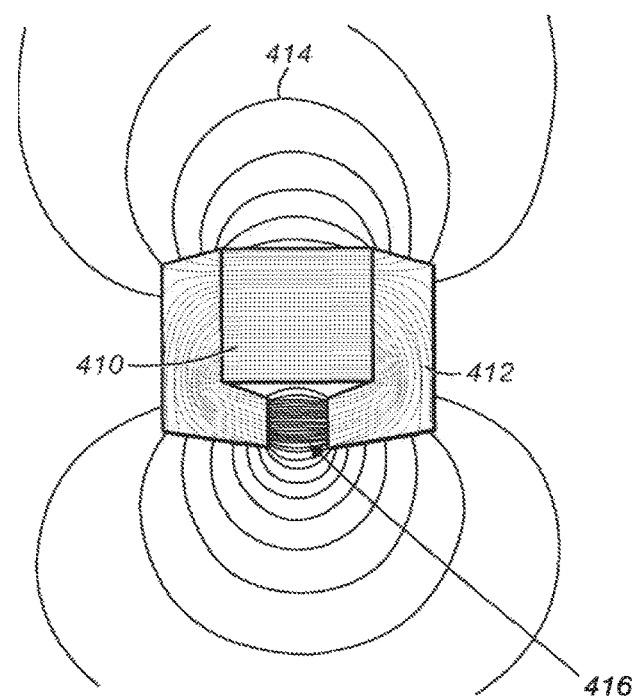
FIG. 4 illustrates a cross-sectional view of an embodiment of a portion of a marine seismic source according to this disclosure.

Turning now to FIG. 4, a cross-sectional detail view of a magnet that may be used in accordance with this disclosure is shown. Magnet 410 is in this embodiment a permanent magnet (e.g., made of a ferromagnetic substance). Magnet 410 has pole pieces 412 attached to its opposite poles. As shown by magnetic field lines 414, pole pieces 412 may have a tendency to concentrate the magnetic field of magnet 410 in a desired region. In particular, in the arrangement shown in FIG. 4, the field is concentrated most strongly in region 416 directly between pole pieces 412. For this reason, pole pieces may be advantageously used in some embodiments of marine seismic sources according to the present disclosure in order to increase the Lorentz force between the magnets and the wire coils. For example, region 416 may in some instances be placed as near as is practicable to the corresponding wire coil in order to increase the Lorentz force therebetween. In some embodiments, the corresponding wire coil may even pass through region 416.

Figure 5A:
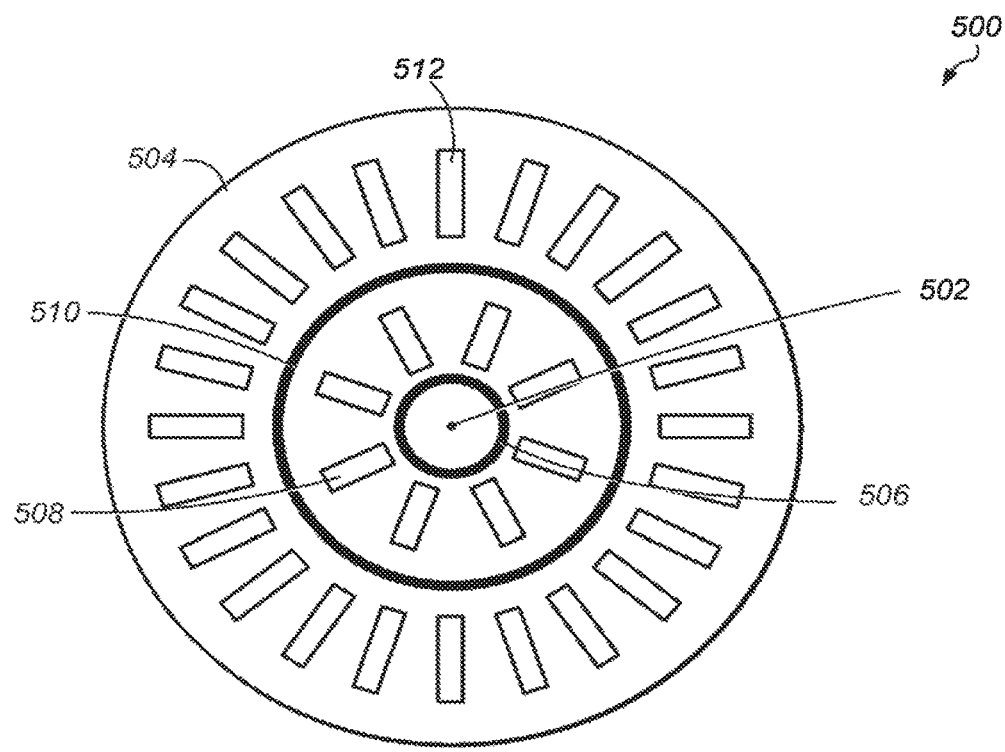
FIGS. 5A-5B illustrate a disassembled view of an embodiment of a marine seismic source according to this disclosure.
Figure 5B:
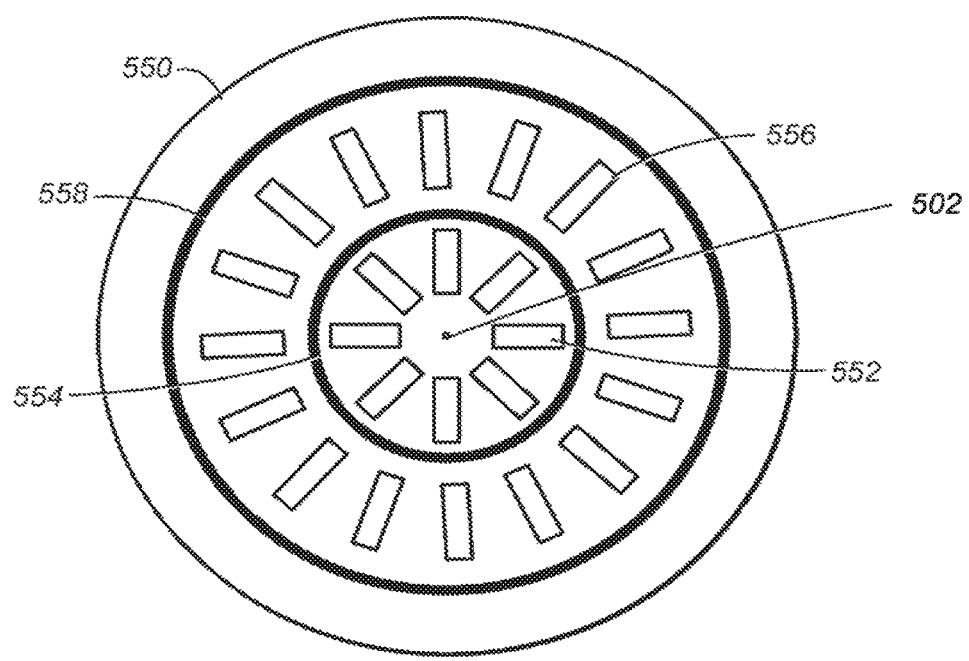

Turning now to FIGS. 5A and 5B, another embodiment of a marine seismic source according to this disclosure. Marine seismic source 500 includes top plate 504 and bottom plate 550. Similar to FIGS. 2A and 2B, marine seismic source 500 is designed such that top plate 504 and bottom plate 550 would be aligned along axis 502 in the assembled apparatus.

Due (for example) to differences in mass between magnets and wire coils, it may sometimes be the case that the combined mass of one plate (that is, the mass of the plate plus the mass of any magnets and/or wire coils attached thereto) is larger than the combined mass of the opposite plate. In some cases, however, it may be advantageous for the plates of a marine seismic source according to this disclosure to have equal mass (or approximately equal mass, such as within 1% of one another, within 2% of one another, within 3% of one another, within 4% of one another, within 5% of one another, within 10% of one another, etc.). Equalizing the mass of the two plates may have advantageous effects on the sound pressure level, the resonance frequency, the frequency spectrum, and/or other characteristics of some embodiments of marine seismic sources according to this disclosure.

Although mass equalization may in some instances be achieved by simply adding mass to the lighter of the plates, it may also be achieved in some cases by arranging a marine seismic source according to this disclosure such that a first portion of the plurality of magnets is attached to the top plate and a second portion of the plurality of magnets is attached to the bottom plate, instead having all of the magnets attached to one plate, and all of the wire coils attached to the other plate. One example of such an embodiment is marine seismic source 500.

As shown, top plate 504 includes wire coil 506, magnet set 508, wire coil 510, and magnet set 512. Bottom plate 550 includes magnet set 552, wire coil 554, magnet set 556, and wire coil 558. In this embodiment, the magnet sets and wire coils are arranged such that, in the assembled apparatus, wire coil 506 would correspond to magnet set 552, wire coil 554 would correspond to magnet set 508, wire coil 510 would correspond to magnet set 556, and wire coil 558 would correspond to magnet set 512. One of ordinary skill in the art with the benefit of this disclosure will understand that any suitable number of wire coils and magnet sets may be used in a particular embodiment. It should be noted that while marine seismic source 500 shows an arrangement in which the respective wire coils and magnet sets are alternated with one another, this is not necessary. The wire coils and magnet sets may be arranged in any suitable configuration.

For the sake of simplicity in FIGS. 5A and 5B, the polarities of the magnets are not shown. One of ordinary skill in the art with the benefit of this disclosure will understand that it may be advantageous for the magnets within a particular set all to have the same polarity in order to increase the total Lorentz force. However, this is not a requirement, and it is also not a requirement that the polarity of a particular set of magnets within marine seismic source 500 have the same polarity as the other sets.

For example, magnet sets 508 and 512 may or may not have the same polarity, magnet sets 508 and 552 may or may not have the same polarity, etc. The circuitry that controls wire coils 506, 510, 554, and 558 may in some instances take into account the polarity of the corresponding magnet set. So for example, one particular wire coil may be driven with a sinusoidal voltage, and a different wire coil may be driven with a sinusoidal voltage having a 180° phase offset, as appropriate based on the polarity of the corresponding magnet sets.

Figure 6:
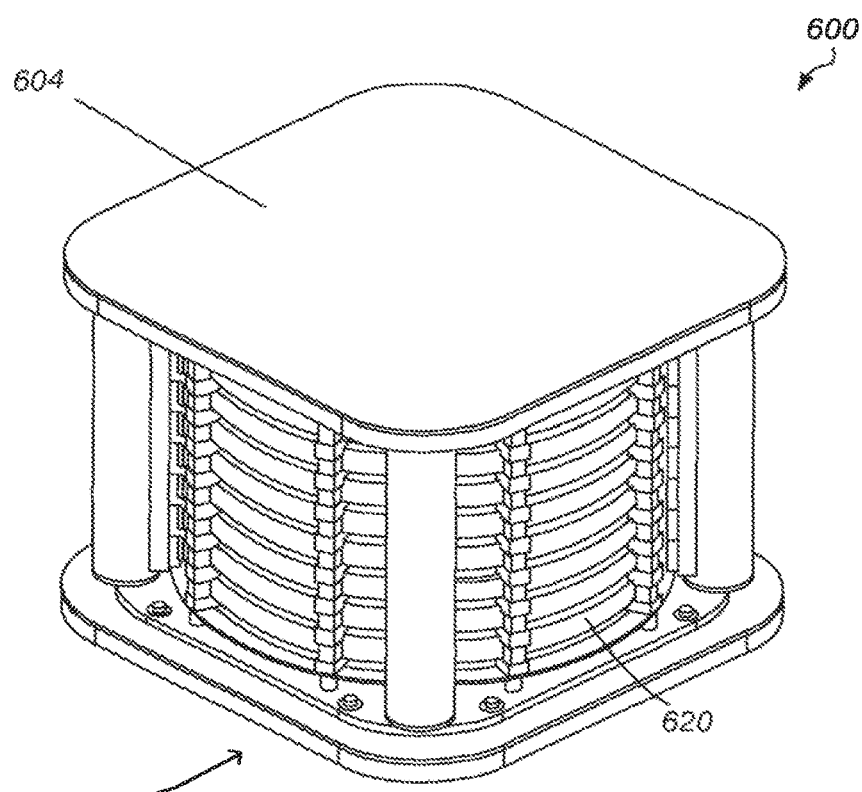
FIG. 6 illustrates an embodiment of a marine seismic source according to this disclosure.

Turning now to FIG. 6, an embodiment is illustrated in which an array of several individual marine seismic sources 620 may be arranged in a housing into stack assembly 600. Although the individual marine seismic sources 620 are capable of providing seismic energy, it may be advantageous to combine them in some embodiments into a stack such as stack assembly 600. Such an arrangement may in some instances be used to increase the total sound pressure level achievable, relative to what may be achievable via a single marine seismic source 620. In one embodiment, stack assembly 600 may include marine seismic sources 620 in a series configuration. In other embodiments, parallel configurations are possible, as well as embodiments that incorporate both series and parallel components. Stack assembly 600 may include top plate 604 and bottom plate 650 to which marine seismic sources 620 may be secured.

Figure 7:
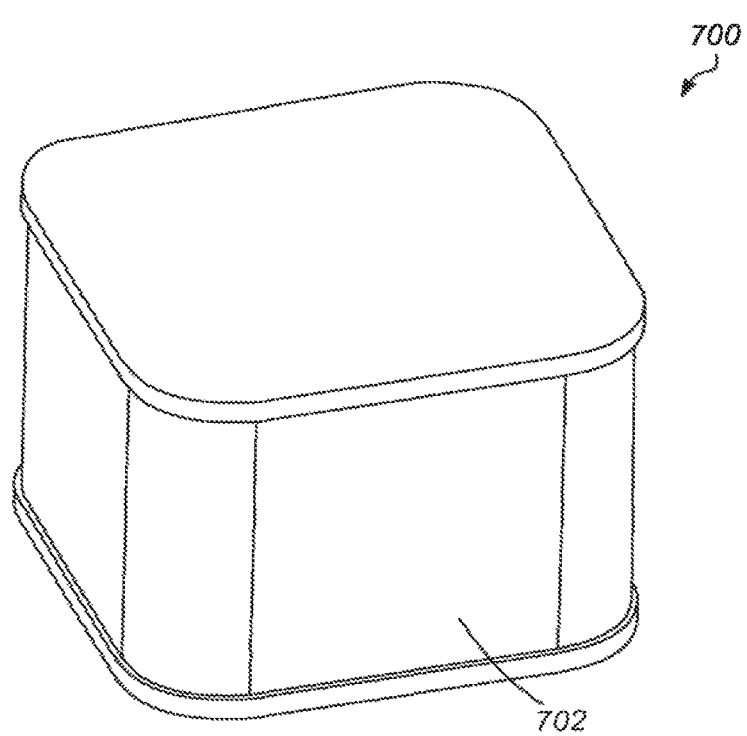
FIG. 7 illustrates an embodiment of a marine seismic source according to this disclosure.

FIG. 7 illustrates yet another embodiment of a stack assembly in which stack assembly 700 additionally includes boot assembly 702. Boot assembly 702 may enclose and/or be disposed around the individual marine seismic sources shown in FIG. 6, for example. In one particular embodiment, boot assembly 702 may include a liquid (in some cases, an electrically insulating material such as an electrically insulating oil may be used) in which the individual marine seismic sources may be immersed or at least partially disposed. This liquid may serve as an additional protective layer for the individual marine seismic sources, and it may also provide a medium through which seismic energy is transmitted.

Figure 8:
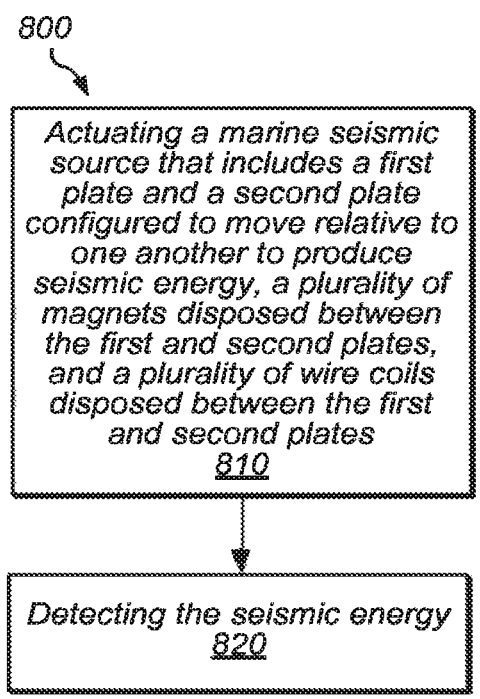
FIG. 8 illustrates an embodiment of a method according to this disclosure.

Turning now to FIG. 8, flow diagrams are presented in accordance with aspects of this disclosure. It should be understood that in some embodiments, fewer than all steps of a particular process flow may be performed in accordance with this disclosure. Further, it should be understood that in some embodiments, steps may be performed in a different order.

FIG. 8 is a flow diagram illustrating an embodiment of a method 800 of operating an apparatus according to this disclosure. Flow begins at block 810, in which a marine seismic source is actuated. The marine seismic source includes a first plate and a second plate configured to move relative to one another to produce seismic energy, a plurality of magnets disposed between the first and second plates, and a plurality of wire coils disposed between the first and second plates. The seismic energy may be transmitted from the marine seismic source into a surrounding medium, such as seawater. The magnets and wire coils may be disposed in any suitable configuration. Certain examples of suitable configurations have been described above. For example, in some instances, all of the magnets may be disposed on the first plate, and all of the wire coils may be disposed on the second plate (or vice versa). In other instances, each plate may include some magnets and some wire coils.

In some instances, the marine seismic source may be a single source (e.g., an individual bender). In other instances, it may be an array of such single sources. If the marine seismic source includes an array of single sources, then it is contemplated that more than one source in the array of sources may include first and second plates. For example, each source in the array may be substantially similar to the others in the array. For example, each source in the array may include first and second plates. Flow proceeds to block 820.

At block 820, the seismic energy is detected. This may be accomplished via any of various types of sensors, such as hydrophones, geophones, accelerometers, etc. Further, the seismic energy may in some embodiments be detected after it has interacted with various subsea formations. Flow ends at block 820.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   actuating a vibratory emitter apparatus, wherein the vibratory emitter apparatus includes:
   a hoop;
   a first plate and a second plate that define an interior cavity between the first plate, the second plate, and the hoop;
   a plurality of magnets disposed in the interior cavity; and
   a plurality of wire coils disposed in the interior cavity;
   wherein the actuating includes causing an electric current to be passed through the plurality of wire coils such that the plurality of magnets move relative to ones of the wire coils to cause the first plate to flex inwardly and outwardly in a direction of a central axis of the first plate and to cause the second plate to flex inwardly and outwardly in a direction of a central axis of the second plate.

2. The method of claim 1, further comprising towing the vibratory emitter apparatus behind a survey vessel in a body of water.

3. The method of claim 2, wherein the vibratory emitter apparatus is towed at a depth of between 35 and 190 meters.

4. The method of claim 1, further comprising:
   actuating a plurality of vibratory emitters that each include a first plate, a second plate, a hoop, a plurality of magnets, and a plurality of wire coils.

5. The method of claim 4, wherein the plurality of vibratory emitters are arranged in a series configuration.

6. The method of claim 1, further comprising:
   producing a geophysical data product, including recording reflections of energy emitted by flexing of the first plate using a non-transitory computer-readable medium.

7. An apparatus, comprising:
   a hoop;
   a first plate exposed on an exterior surface of the apparatus;
   a second plate, wherein the first plate, the second plate, and the hoop define an interior cavity between the first plate, the second plate, and the hoop;
   a plurality of magnets disposed within the interior cavity; and
   a plurality of wire coils disposed within the interior cavity;
   wherein, in response to an electric current being passed through the plurality of wire coils, the plurality of magnets are configured to move relative to ones of the wire coils to cause the first plate to flex inwardly and outwardly in a direction of a central axis of the first plate and to cause the second plate to flex inwardly and outwardly in a direction of a central axis of the second plate.

8. The apparatus of claim 7, wherein the apparatus is configured to control the first plate to flex to emit energy within a frequency range of 2 Hz to 20 Hz.

9. The apparatus of claim 7, wherein the plurality of magnets are attached to the first plate and the plurality of wire coils are attached to the second plate.

10. The apparatus of claim 7,
    wherein a first portion of the plurality of magnets is attached to the first plate and a second portion of the plurality of magnets is attached to the second plate; and
    wherein a first portion of the plurality of wire coils corresponding to the second portion of the plurality of magnets is attached to the first plate and wherein a second portion of the plurality of wire coils corresponding to the first portion of the plurality of magnets is attached to the second plate.

11. The apparatus of claim 10, wherein the first portion of the plurality of magnets and the first portion of the plurality of wire coils are arranged in an alternating fashion on the first plate.

12. The apparatus of claim 7, wherein three or more of the plurality of magnets are positioned at a same distance from a point on the first plate.

13. The apparatus of claim 12, wherein the three of more of the plurality of magnets are oriented with a same pole facing toward the point.

14. The apparatus of claim 13, wherein at least one of the wire coils is located within a circular region defined by the three or more of the plurality of magnets.

15. The apparatus of claim 7, wherein one or more sets that include one of the magnets and one of the wire coils are disposed in pairs parallel to the central axis of the first plate with the magnet attached to one plate of the first and second plates and the wire coil attached to the other plate of the first and second plates.

16. The apparatus of claim 15, wherein ones of the plurality of magnets include one or more pole pieces.

17. The apparatus of claim 7, wherein the apparatus is included in a stacked array of sources.

18. The apparatus of claim 7, wherein one or more of the wire coils include multiple loops.

19. The apparatus of claim 7 wherein the first plate is parallel to the second plate.

20. An apparatus, comprising:
    a first plate exposed on an exterior surface of the apparatus;
    a second plate parallel to the first plate;
    a hoop disposed between the first and second plates and defining an interior cavity between the first plate, the second plate, and the hoop;
    a first plurality of magnets disposed within the interior cavity and attached to one of the first and second plates; and
    a plurality of wire coils disposed within the interior cavity and attached to the other plate of the first and second plates;

wherein one or more pairs that include one of the magnets and one of the wire coils are oriented parallel to a central axis of the first plate; and wherein, in response to an electric current being passed through the plurality of wire coils, the first plurality of magnets are configured to move relative to ones of the wire coils to cause the first plate to flex inwardly and outwardly in a direction of the central axis of the first plate and to cause the second plate to flex inwardly and outwardly in a direction of a central axis of the second plate.

* * * * *